United States Patent Office 3,276,891
Patented Oct. 4, 1966

3,276,891
WATERPROOFING OF LEATHER AND FURS
Rudi Heyden, Dusseldorf, and Jürgen Plapper, Dusseldorf-Holthausen, Germany, assignors to Böhme Fettchemie G.m.b.H., Dusseldorf, Germany, a corporation of Germany
No Drawing. Filed May 10, 1965, Ser. No. 454,643
Claims priority, application Germany, Mar. 23, 1960,
B 57,177
14 Claims. (Cl. 106—287)

This application is a continuation-in-part of my copending United States application Serial No. 95,830, filed March 15, 1961, and now abandoned.

The invention relates to leather and furs impregnated with a compound selected from the group consisting of partial esters and partial amides of a polycarboxylic acid and partial esters and partial ethers of polyalcohols, said compound having at least one unsaturated lipophilic radical in said ester, amide and ether moiety. The invention also relates to a novel method for waterproofing leather and furs by impregnating the same with a solution of a compound selected from the above group in an organic solvent. The invention further relates to novel compositions for waterproofing leather and furs.

The prior art has attempted to waterproof leather by treatment with succinic acids substituted with high molecular weight alkenyl radicals or the partial esters of said succinic acids. However, the thus treated leather has a very high water absorption and swells considerably. Consequently, when the said treated leather is subjected to high mechanical stress, it dries only with great difficulty.

It is an object of the invention to provide leather and furs having a low water absorption and a very low water penetration.

It is a further object of the invention to provide a novel method for waterproofing leather and furs.

It is another object of the invention to provide novel compositions useful for waterproofing leather and furs comprising a solution of a compound selected from the group consisting of partial esters and partial amides of polycarboxylic acids and partial esters and partial ethers of polyalcohols, said compounds having at least one unsaturated lipophilic radical in said ester, amide and ether moiety, in an organic solvent for said compound.

These and other objects and advantages of the invention will become obvious from the following detailed description.

The compositions of the invention, useful for waterproofing leather and furs, comprise a solution of a compound selected from the group consisting of partial esters and partial amides of a polycarboxylic acid selected from the group consisting of aliphatic polycarboxylic acids having 3 to 10 carbon atoms and 2 to 4 carboxylic acid groups, amino aliphatic polycarboxylic acids having 4 to 10 carbon atoms and 2 to 4 carboxylic acid groups and phenyl polycarboxylic acids and hydroxy phenyl polycarboxylic acids having 2 to 6 carboxylic acid groups and partial esters and partial ethers of polyalcohols having 2 to 10 carbon atoms and at least two free hydroxy groups which compound contains at least one unsaturated lipophilic radical of 8 to 22 carbon atoms in said ester, amide and ether moiety, in an organic solvent for said compound. The said compounds, which are primarily oily products, should possess at least one free carboxy group or at least two free hydroxy groups.

The partial esters, amides and ethers are known compounds and can be prepared by conventional techniques such as reaction with high molecular weight unsaturated carboxylic acids, alcohols, amines, halides, etc. The concentration of said products in the organic solvents may vary from 1% to 25%, preferably about 10% to 20%.

The polycarboxylic acids may be aliphatic or aromatic polycarboxylic acids, but are preferably aliphatic polycarboxylic acids having 3 to 6 carbon atoms. The polycarboxylic acids may also have hydroxy groups. Examples of suitable polycarboxylic acids are alkanedioic acids of 3 to 10 carbon atoms such as malonic acid, succinic acid, suberic acid and azelaic acid; alkenedioic acids of 3 to 10 carbon atoms such as maleic acid and fumaric acid; alkanedienedioic acid of 3 to 10 carbon atoms such as muconic acid; hydroxy alkanetrioic acids of 3 to 10 carbon atoms such as citric acids; hydroxy alkanedioic acids of 3 to 10 carbon atoms such as tartaric acid; alkanetetroic acids of 4 to 10 carbon atoms such as ethane tetraacetic acid; amino acids of 2 to 10 carbon atoms and 2 to 4 carboxylic acid groups such as imino diacetic acid and ethylene diamine tetraacetic acid; phenyl polycarboxylic acids having 2 to 6 carboxylic acid groups such as phthalic acid, trimesic acid, mellitic acid and trimellitic acid; and hydroxy phenyl polycarboxylic acids having 2 to 5 carboxylic acid groups such as hydroxy phthalic acid.

The polyalcohols of 2 to 10 carbon atoms may be aliphatic or aromatic and should have at least three hydroxy groups. They may also contain carboxy groups. Examples of suitable polyalcohols are alkanetriols such as glycerine, pentanetriols and hexanetriols; alkane polyalcohols containing 4 or more hydroxy groups such as pentaerythrite and dipentaerythrite; sugar alcohols such as sorbitol, mannitol and inosite; aromatic polyols such as pyrogallic acid; and carboxy substituted aromatic polyols such as pyrogallic carboxylic acid.

The unsaturated lipophilic radical may be derived from high molecular weight unsaturated compounds having 8 to 22 carbon atoms such as alcohols, halides, amines, acids and acid halides having one or more double bonds. Examples of suitable compounds are alkeneoic acids such as decenic acid, dodecenic acid and oleic acid; alkadieneoic acids such as linoleic acid; alkatrieneoic acids such as linolenic acid; alkenoic acid halides such as oleic acid chloride; alkeneols such as decenol, tetradecenol and oleyl alcohol, alkeneamines such as dodecenylamine and oleylamine; alkene halides such as oleyl chloride; and the like.

The following list of compounds is a sample of some of the partial esters, amides and ethers which may be used in the compositions: malonic acid monodecenyl ester, succinic acid monododecenyl ester, maleic acid mono-oleyl ester, citric acid mono-oleyl ester, citric acid dioleyl ester, citric acid mono-oleylamide, N-dodecenylimino diacetic acid, N-oleylimino diacetic acid, glycerine mono-linoleic acid ester, pentaerythrite mono-oleic acid ester, pentaerythrite didocene acid ester, 1,3,6 - hexanetriol monotetradecenyl ether, the undecenyl ether of citric acid mono-oleyl ester, the dioleyl ester of ethylenediamino tetraacetic acid and 4-hydroxyphthalic acid mono-oleyl ester. Particularly good effects are obtained with the partial esters of tartaric acid, or citric acid esterified with a mono-unsaturated fatty alcohol having at least 12 carbon atoms, especially with oleyl alcohol.

Examples of organic solvents in which the impregnating agents may be dissolved for employment in the present invention are trichloroethylene, perchloroethylene, gasoline, toluene, isopropanol and other lower alkanols, methylethyl ketone, cyclohexanone, butyl acetate, etc. The selection of the particular solvent will depend upon the solubility characteristics of the impregnating compound.

The compositions of the invention may be used alone or in combination with other compositions useful for waterproofing leather. The use of the present compositions with organic solutions of cationic-active, complex salts formed by condensation of polyvalent metal alcoholates with acid high molecular weight esters of phosphoric acid as described in United States Patent No. 2,885,417 is particularly desirable. The impregnation with these agents may be performed simultaneously or in sequence.

Suitable alcoholates as described in Patent No. 2,855,417 are magnesium, titanium, zirconium or aluminum alcoholates wherein the alkyl radical has 1 to 12 carbon atoms, preferably lower alkyls. Examples of suitable alcoholates are aluminum isopropylate, aluminum butylate, aluminum octylate and aluminum dodecylate. Neutral alcoholates are usually used but basic alcoholates may also be used to form the complexes. Mixtures of various alcoholates may be used.

The acid esters of the phosphoric acids are the mono and diesters. The alcohol portion of the ester is derived from aromatic or aliphatic alcohols having more than six carbon atoms. The diesters may be used in admixture with the monoesters or esters whose alcohol radicals contain substitutents or are interrupted by hetero atoms or groups containing hetero atoms. The acid portion of the ester may be phosphoric acid such as phosphoric alkylamides, alkylphosphoric acid or alkylphosphinic acid. Examples of suitable esters are phosphoric acid mono-octyl ester, phosphoric acid mono-dodecyl ester, phosphoric acid mono-oleyl ester, phosphoric acid mono-alkylphenol ester wherein the alkyl has 3 to 18 carbon atoms, phosphoric acid mono-naphthenyl esters, phosphoric acid mono-abietyl ester, etc.

The complexes are usually formed in the presence of organic solvents such as isopropanol, toluene, aliphatic halogens or trichloroethylene wherein the ratio of metal alcoholate to phosphoric acid ester is 1:0.5 to 1.5 but other molar ratios may be used. In some instances the complex may be formed by using solutions of the starting material.

By dissolving the said complexes in the compositions of the present invention, a one step impregnation may be used. If necessary, complex stabilizers such as acetylacetone, acetylacetate, etc., may be added to the composition.

All types of leather and furs may be impregnated with the aid of the impregnating compositions of the invention. Particularly surprising was the fact that not only aluminum-tanned, chrome-tanned and chrome-combination-tanned leathers can be made water-resistant therewith, but also that synthetically or vegetable-tanned leather can be made water-repellent. This could not have been foreseen because synthetically or vegetable-tanned leathers do not, as a rule, comprise any groups which could combine with the derivatives of polycarboxylic acids or polyalcohols to form complexes. Also a considerably improved impregnation effect can be achieved with mineral-tanned leather if the compounds are used in solution in organic solvents instead of in aqueous dispersions.

The treated leather has an excellent water-repellent effect and particularly does not permit water penetration while remaining soft and supple and uninfluenced in its drying and finishing properties. The leather has a particularly low water absorption under static as well as dynamic conditions and the leather is not hardened. The method of the invention is particularly useful in the manufacture of modern, non-fatted waterproof leather. Finished leather for uppers of shoes and sole leather may be impregnated with the compositions of the invention.

The leather may be treated by any of the usual techniques such as brushing, immersion, spraying or surface application machines. The compositions of the invention should be used in sufficient amounts so that there is 2 to 25%, preferably 5 to 10%, of the partial ester, amide or ether based on the weight of the leather to be treated present in the treatment. After the composition has been applied to the leather, the leather is slowly dried in air or in a drying device at slightly elevated temperatures.

For application of the waterproofing agent by the spray method, solvent mixtures with high boiling points, such as heavy fractions of gasoline, toluene or xylene are suitable. By addition of small amounts of mineral oils it is possible to apply the impregnating agents so they will not adhere excessively to the surface of the leather being sprayed, but rather penetrate into the leather. Low boiling point solvents are unsuitable for spraying because they evaporate too rapidly during spraying and the impregnating agents are deposited primarily on the surface of the leather. If the immersion method is used, the distribution of the impregnating agent in the leather may also be controlled by changing the high boiling point solvents.

The impregnation effect, especially the water-repellent effect of the leather surface, may be further improved if silicone oils and/or hard waxes are added to the compositions of the invention. The term "silicone oils" is intended to include primarily the known bi- and tri-functional methylsiloxanes with reactive hydrogen atoms, as well as other polymerizates of organo-silicon compounds which are characterized by a —Si—O—Si— group or also by other bonds, such as —Si—CH$_2$—Si— or —Si—C$_6$H$_4$—Si—

In the silicones the silicon atoms may be substituted with organic radicals, such as alkyl, aryl, aralkyl, alkylaryl or alkoxy groups. Of particular interest are those organo-silicon polymers which contain not only organic radicals, such as methyl, but also hydrogen atoms. These products are commercially available in the form of solutions in organic solvents, such as methylene chloride, which, in addition, usually contain catalysts, such as tetrabutyl esters of titanic acid. Suitable hard waxes are natural or synthetic wax products, such as paraffin wax, carnauba wax and particularly montan wax, or ester waxes and carbonamide waxes of a synthetic nature. The various components may readily be dissolved in the compositions. The additives increase the waterproofing effect, so that smaller quantities of the compositions of the invention may be used if these additives are employed simultaneously.

In the following examples there are disclosed several preferred embodiments to illustrate the invention. However, it should be understood that the invention is not intended to be limited to the specific embodiments.

EXAMPLE I

Sole leather was immersed for 15 minutes in a 10% solution of citric acid mono-oleyl ester in trichloroethylene, dried slowly and then rolled. A highly water-repellent sole leather with very low water absorption characteristics was obtained and offered high resistance against the penetration of water, particularly under dynamic test conditions (Permeometer according to Bally).

| | Water permeability quotient according to Stather/Herfeld | Water absorption (Kubelka) after: | | | Water penetration (Bally permeometer) |
|---|---|---|---|---|---|
| | | 30 min. | 2 hrs. | 24 hrs. | |
| Control | 0.2 | Percent 35 | Percent 44 | Percent 49 | 7 min. |
| 10% solution of citric acid mono-oleyl ester in trichloroethylene. | above 1.1. | 11 | 17 | 40 | 245 min. |

EXAMPLE II

Chrome-tanned leather suitable for the upper part of shoes was brushed twice on the flesh side with a 10% solution of citric acid mono-oleyl ester in trichloroethylene. A leather with a particularly high resistance against penetration of water under dynamic test conidtions was obtained. The normal unimpregnated leather of the same type was compared in water under the conditions of the Maeser test method. Water penetrated into the normal leather after an average of 300 to 500 bends. The test of the leather impregnated according to the invention was discontinued after 50,000 bends and up to this point no water had penetrated into the leather.

EXAMPLE III

A sample of purely vegetable-tanned, finished leather for the upper part of shoes was immersed into a 10% solution of citric acid mono-oleyl ester in heavy gasoline fractions for 5 minutes, and the impregnated leather was slowly dried. Another sample of the leather was treated in the same manner except that citric acid dioleyl ester was used in place of citric acid mono-oleyl ester. After drying, a soft, supple leather was obtained from each sample. Tested in the Maeser machine, the samples of leather furnished the following values:

|  | Water penetration (number of bends) | Water absorption after: | |
|---|---|---|---|
|  |  | 10,000 bends | 20,000 bends |
|  |  | Percent | Percent |
| Control | 95 | 277 | 285 |
| Citric acid mono-oleyl ester—10% solution | 18,500 | 17 | 26 |
| Citric acid dioleyl ester—10% solution | 5,300 | 53 | 72 |

EXAMPLE IV

Chrome-tanned boxcalf leather samples were immersed in a 20% solution of one of the substances 2 through 8 in the table below for 5 minutes. Depending upon their solubility, these substances were dissolved in gasoline or in trichloroethylene. After drying in the air, the leather samples were tested for their water-repellent properties in the Maeser machine. The following values were obtained:

| Impregnating agent in 20% solution | Water penetration after: | Water absorption after 10,000 bends |
|---|---|---|
|  | Bends | Percent |
| 1. Control | 530 | 75 |
| 2. Malonic acid mono-oleyl ester | 10,000 | 10.5 |
| 3. Maleic acid mono-oleyl ester | 18,000 | 8.5 |
| 4. Pentaerythrite-mono-oleic acid ester | 21,000 | 28 |
| 5. Pentaerythrite-di-oleic acid ester | 36,000 | 40 |
| 6. Citric acid mono-oleyl-amide | 55,000 | 27 |
| 7. Citric acid di-oleyl ester | 85,000 | 17 |
| 8. Citric acid mono-oleyl ester | 100,000 | 9 |

EXAMPLE V

Samples of a chrome-tanned, fat-liquored and customarily finished calf leather were immersed for 5 minutes into the solution described under I and II below, and were then dried in the air. The solutions had the following compositions:

Solution I 2.5 parts of a condensation product of aluminum isopropylate and an acid dodecylphosphoric acid ester mixture
0.75 parts acetyl acetic acid ester
1.25 parts montan wax
2.5 parts silicone oil
93.0 parts trichloroethylene
———
100.0

Solution II 2.0 parts of a condensation product of aluminum isopropylate and an acid dodecylphosphoric acid ester mixture
1.0 part montan wax
2.0 parts silicone oil
1.25 parts citric acid mono-oleyl ester
93.75 parts trichloroethylene
———
100.0

The leather was tested for its water-repellent properties in the Maeser machine, and furnished the following values:

|  | Water penetration after: | Water absorption after 10,000 bends | Water absorption (Kubelka) after: | | |
|---|---|---|---|---|---|
|  |  |  | 30 min. | 2 hrs. | 24 hrs. |
|  | Bends | Percent | Percent | Percent | Percent |
| Control | 150 | 134 | 106 | 122 | 151 |
| Impregnated with Solution I | 18,000 | 28 | 21 | 39 | 78 |
| Impregnated with Solution II | 100,000 | 22.5 | 17 | 31 | 63 |

EXAMPLE VI

Samples of combination chrome-tanned, waterproof leather (thickness 1.7 mm.) finished with plastic coating dyes, having an extractable fat content of not more than 8 to 10%, was immersed for 10 minutes into Solution I and Solution II described in Example V. In comparison to normal, unimpregnated leather, the following water-resistance values were obtained after drying:

|  | Water penetration after: | Water absorption after 10,000 bends | Water permeability after 10,000 bends |
|---|---|---|---|
|  | Bends | Percent |  |
| Control | 170 | 47.2 | 32.5 gm. |
| Impregnated with Solution I | 17,385 | 2.2 | 0 |
| Impregnated with Solution II | 54,200 | 1.7 | 0 |

EXAMPLE VII

Samples of dry sole leather were immersed for 15 minutes in the Solutions I and II described in Example V and were then slowly dried and rolled. The testing of the finished sole leather samples were accomplished by the Baumann method with the aid of the Bally permeometer. The control normal sole leather was penetrated by water after 10 minutes and the sole leather treated with Solution I after 65 minutes, whereas water did not penetrate the sole leather immersed into Solution II until after 3½ hours.

Various modifications of the method or compositions of the invention may be made without departing from the spirit or scope thereof, and it is to be understood that the invention be limited only as defined in the appended claims.

We claim:
1. A method of waterproofing leather and furs which comprises impregnating a material selected from the group consisting of leather and fur with a solution of 1 to 25% of a compound selected from the group consisting of partial esters and partial amides of a polycarboxylic acid selected from the group consisting of aliphatic polycarboxylic acids having 3 to 10 carbon atoms and 2 to 4 carboxylic acid groups, amino aliphatic polycarboxylic acids having 4 to 10 carbon atoms and 2 to 4 carboxylic acid groups and phenyl polycarboxylic acids and hydroxyphenyl polycarboxylic acids having 2 to 6 carboxylic acid groups, and having at least one free carboxy group and partial esters and partial ethers of polyalcohols having 2 to 10 carbon atoms and having at least two free hydroxy groups, said compound having at least one unsaturated aliphatic radical of 8 to 22 carbon atoms in said partial ester, amide and ether moieties in an organic solvent wherein the total amount of the compound is between 2 to 25% based on the weight of the material being impregnated and drying the impregnated material.

2. The method of claim 1, wherein the mono-oleyl ester of tartaric acid is the impregnating compound.

3. The method of claim 1, wherein the mono-oleyl ester of citric acid is the impregnating compound.

4. A method of waterproofing leather and fur which comprises impregnating a material selected from the group consisting of leather and fur with a solution of 1 to 25% of a compound selected from the group consisting of partial esters and partial amides of a polycarboxylic acid selected from the group consisting of aliphatic polycarboxylic acids having 3 to 10 carbon atoms and 2 to 4 carboxylic acid groups, amino aliphatic polycarboxylic acids having 4 to 10 carbon atoms and 2 to 4 carboxylic acid groups and phenyl polycarboxylic acids and hydroxyphenyl polycarboxylic acids having 2 to 6 carboxylic acid groups, and having at least one free carboxy group and partial esters and partial ethers of polyalcohols having 2 to 10 carbon atoms and having at least two free hydroxy groups, said compound having at least one unsaturated aliphatic radical of 8 to 22 carbon atoms in said partial ester, amide and ether moieties and 0.5 to 5.0% of a cationic-active, complex salt of a polyvalent metal alcoholate and an acid ester of a phosphoric acid in an organic solvent wherein the total amount of the compound is between 2 to 25% based on the weight of the material being impregnated and drying the impregnated material.

5. The method of claim 4 wherein the lipophilic compound is the mono-oleyl ester of tartaric acid.

6. The method of claim 4 wherein the lipophilic compound is the mono-oleyl ester of citric acid.

7. The method of claim 4 wherein a small amount of mineral oil is present in the impregnating solution.

8. A method for waterproofing leather and furs which comprises impregnating a material selected from the group consisting of leather and furs with a solution of the mono-oleyl ester of citric acid and a complex of aluminum isopropylate and an acid dodecylphosphoric acid ester in an organic solvent, wherein the mono-oleyl ester of citric acid is present in amounts of 2% to 25% based on the weight of the material to be impregnated, drying the impregnated material and recovering the said waterproof material.

9. The method of claim 8 wherein the said mono-oleyl ester is present in amounts of 5% to 10%.

10. A composition for waterproofing leather and furs consisting essentially of a solution of 1 to 25% of a compound selected from the group consisting of partial esters and partial amides of a polycarboxylic acid selected from the group consisting of aliphatic polycarboxylic acids having 3 to 10 carbon atoms and 2 to 4 carboxylic acid groups, amino aliphatic polycarboxylic acids having 4 to 10 carbon atoms and 2 to 4 carboxylic acid groups and phenyl polycarboxylic acids and hydroxyphenyl polycarboxylic acids having 2 to 6 carboxylic acid groups, and having at least one free carboxy group, and partial esters and partial ethers of polyalcohols having 2 to 10 carbon atoms and having at least two free hydroxy groups, said compound having at least one unsaturated aliphatic radical of 8 to 22 carbon atoms in said partial ester, amide and ether moieties, and 0.5 to 5.0% of a cationic-active, complex salt of a polyvalent metal alcoholate and an acid ester of a phosphoric acid in an organic solvent.

11. The composition of claim 10 wherein the partial ester is the mono-oleyl ester of tartaric acid.

12. The composition of claim 10 wherein the partial ester is the mono-oleyl ester of citric acid.

13. A material selected from the group consisting of leather and fur having been impregnated with a solution of 1 to 25% of a compound selected from the group consisting of partial esters and partial amides of a polycarboxylic acid selected from the group consisting of aliphatic polycarboxylic acids having 3 to 10 carbon atoms and 2 to 4 carboxylic acid groups, amino aliphatic polycarboxylic acids having 4 to 10 carbon atoms and 2 to 4 carboxylic acid groups and phenyl polycarboxylic acids and hydroxyphenyl polycarboxylic acids having 2 to 6 carboxylic acid groups, and having at least one free carboxy group and partial esters and partial ethers of polyalcohols having 2 to 10 carbon atoms and having at least two free hydroxy groups, said compound having at least one unsaturated aliphatic radical of 8 to 22 carbon atoms in said partial ester, amide and ether moieties in an organic solvent.

14. A material selected from the group consisting of leather and furs having been impregnated with a solution of 1 to 25% of a compound selected from the group consisting of partial esters and partial amides of a polycarboxylic acid selected from the group consisting of aliphatic polycarboxylic acids having 3 to 10 carbon atoms and 2 to 4 carboxylic acid groups, amino aliphatic polycarboxylic acids having 4 to 10 carbon atoms and 2 to 4 carboxylic acid groups and phenyl polycarboxylic acids and hydroxyphenyl polycarboxylic acids having 2 to 6 carboxylic acid groups, and having at least one free carboxy group and partial esters and partial ethers of polyalcohols having 2 to 10 carbon atoms and having at least two free hydroxy groups, said compound having at least one unsaturated aliphatic radical of 8 to 22 carbon atoms in said partial ester, amide and ether moieties and 0.5 to 5.0% of a cationic-active, complex salt of a polyvalent metal alcoholate and an acid ester of a phosphoric acid in an organic solvent.

References Cited by the Examiner

UNITED STATES PATENTS

| | | | |
|---|---|---|---|
| 2,025,984 | 12/1935 | Harris | 252—8.57 |
| 2,431,202 | 11/1947 | Sanders | 106—287 |
| 2,629,701 | 2/1953 | Ericks | 106—287 |
| 2,801,934 | 8/1957 | Rizzo | 106—220 |
| 2,903,382 | 9/1959 | Berls | 117—135.5 |
| 2,977,249 | 3/1961 | Heyden et al. | 117—135.5 |
| 3,019,133 | 1/1962 | Heyden et al. | 117—142 |

ALEXANDER H. BRODMERKEL, *Primary Examiner.*

D. J. ARNOLD, *Assistant Examiner.*